3,459,647
Patented Aug. 5, 1969

3,459,647
PREPARATION OF 1 - CYANOBICYCLO[1.1.0]
BUTANE AND 1-CYANOCYCLOBUTENE BY
PHOTOLYSIS OF β-CYANOPRENE
David M. Gale, Wilmington, Del., assignor to E. I. du
Pont de Nemours and Company, Wilmington, Del.,
a corporation of Delaware
No Drawing. Filed Dec. 7, 1966, Ser. No. 599,730
Int. Cl. B01j 1/10
U.S. Cl. 204—158       9 Claims

ABSTRACT OF THE DISCLOSURE

A process for preparing 1-cyanobicyclo[1.1.0]butane and 1-cyanocyclobutene by the photolysis of 2-cyanobutadiene at wave lengths between 150 and 4000 A. and in an inert organic solvent in which the butadiene is present in amounts of 0.01 to 50.0% by weight. No other additives are necessary. However the process may be carried out in the presence of a catalytic amount of a cuprous salt.

This invention relates to a new process for photochemical isomerization. More specifically, the invention is directed to a process for preparing 1-cyanobicyclo[1.1.0]butane and 1-cyanocyclobutene by the photolysis of 2-cyanobutadiene.

The use of bicyclo[1.1.0]butanes and cyclobutenes as monomers in the preparation of polymeric compositions has led to a search for new routes to their preparation.

There has now been discovered a process for the treatment of a dilute solution of 2-cyanobutadiene (or β-cyanoprene) in an inert organic solvent with ultraviolet light to obtain a mixture of 1-cyanobicyclo[1.1.0]butane and 1-cyanocyclobutene in which the molar proportion of 1-cyanobicyclo[1.1.0]butane obtained exceeds that of 1-cyanocyclobutene.

The concentration of β-cyanoprene in the solution may be in the range from 0.01 to 50.0% by weight and preferably is in the range from 0.1 to 5.0%.

The process is preferably carried out in the absence of additives. However, it may be conducted in the presence of a catalytic amount of a cuprous salt, if desired. Concentrations of cuprous salts up to the amount to give a saturated solution in the solvent being used are operable. Suitable cuprous salts include the chloride, bromide, carbonate, cyanide, ferricyanide, ferrocyanide, fluoride, iodide, fluosilicate, sulfate, sulfite, sulfide and thiocyanate.

The ultraviolet light employed in the process is light having a wave length in the range from 150 to 4000 A. Preferably, light of wave length in the range from 1500 to 3500 A. is used and most preferably in the range from 2000 to 3500 A.

Organic solvents suitable for carrying out the process include those which are inert to the reactants and products. Such solvents include the aliphatic linear and cyclic hydrocarbon ethers such as dimethyl ether, diethyl ether, tetrahydrofuran, ethylene glycol dimethyl ether, diethylene glycol dimethyl ether, dioxane, dioxolane and the like; aliphatic hydrocarbons such as pentane, hexane, heptane, cyclohexane, isooctane and the like; and halogenated aliphatic hydrocarbons such as chloroform, carbon tetrachloride, dichloromethane, chlorodifluoromethane, chlorotrifluoromethane, 1,2-dichlorotetrafluoroethane, 1,1,2-trichlorotrifluoroethane, 1,2-difluorotetrachloroethane, 1,2-dibromotetrafluoroethane and the like.

Temperature and pressure are not critical factors in the process of this invention. Temperatures in the range from −100° C. to +100° C. are ordinarily employed, and preferably, for convenience, temperatures in the range of 0–50° C. are used, especially room temperatures. Pressures both above and below atmospheric pressure are operable. Atmospheric pressure is preferred for convenience.

The reaction time depends on the intensity of the light source and the concentration of the solution being treated. For very intense light sources only a few seconds (i.e., 1 to 5) are needed. This makes the process suitable for a continuous flow system. With light sources of low intensity, periods up to 4 weeks may be necessary.

The process of this invention is illustrated in greater detail by the examples which follow. Parts are by weight unless otherwise specified.

Example 1

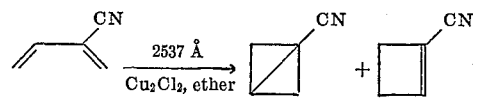

A 2% solution of β-cyanoprene in anhydrous ether saturated with Cu₂Cl₂ was photolyzed for five days employing a quartz apparatus, cooled with tap water (ca. 15° C.) and equipped with 16 low-pressure mercury lamps. The most intense wave length produced by these lamps is at 2537 A. When the photolysis was completed, the reaction mixture was filtered and the ether removed from the filtrate under reduced pressure (ca. 10–20 mm.). A sample of the residue, stabilized with hydroquinone, was shown to contain β-cyanoprene, 1-cyanobicyclo[1.1.0]butane, and 1-cyanocyclobutene by nuclear magnetic resonance (NMR) spectra comparisons with authentic samples.

The authentic sample of 1-cyanobicyclo[1.1.0]butane was prepared from 3-cyanocyclobutanone by treating it with sodium borohydride in water to obtain 3-hydroxycyclobutanecarbonitrile. This in turn was treated with pyridine and thionyl chloride in chloroform solution to obtain 3-chlorocyclobutanecarbonitrile which was treated with potassium t-butoxide in tetrahydrofuran to obtain 1-cyanobicyclo[1.1.0]butane. The sample of 1-cyanocyclobutene was prepared from 1-cyclobutenecarboxylic acid by converting it to the acid chloride with phosphorus trichloride. Treatment of the acid chloride with a solution of ammonia in ether gave the carboxamide which was dehydrated with phosphorus pentoxide to yield 1-cyanocyclobutene.

Example 2

A 2.9-gram sample of β-cyanoprene dissolved in 350 ml. of anhydrous ether saturated with Cu₂Cl₂ was photolyzed, employing the apparatus of Example 1, for 131.5 hours. The work-up procedure of Example 1 led to 2 g. of yellow liquid. Analysis by NMR showed that 1-cyanobicyclobutane was formed in about 28.5% yield (at 16% conversion) and that 1-cyanocyclobutene was formed in about 15.5% yield (at 9% conversion). Short path distillation of this residue led to mixtures of 1-cyanobicyclo[1.1.0]butane and 1-cyanocyclobutene.

Example 3

A solution of 9.88 g. of β-cyanoprene in 400 ml. of CCl₄ saturated with Cu₂Cl₂ was photolyzed for 93 hours using the procedure of Example 1. The NMR spectrum of the product confirmed the presence of both 1-cyanobicyclo[1.1.0]butane and 1-cyanocyclobutene.

Example 4

A solution of 1.4 g. of β-cyanoprene in 250 g. of ether was photolyzed for 94 hours using the procedure of Example 1. The reaction mixture was separated by gas chromotography. In addition to 40% recovered β-cyanoprene it contained 38.4% 1-cyanobicyclo[1.1.0]butane and 21.5% 1-cyanocyclobutene.

The 1-cyanobicyclo[1.1.0]butane prepared in the process of this invention can be separated and employed as a monomer in the preparation of polymers. For example, 1-cyanobicyclo[1.1.0]butane can be homopolymerized or copolymerized with an ethylenically unsaturated monomer such as acrylonitrile to prepare polymers which can be drawn into fibers. These fibers find utility in the ordinary fiber applications, such as in textile.

In addition, a mixture of 1-cyanobicyclo[1.1.0]butane and 1-cyanocyclobutene can be polymerized to form a heat-stable thermoplastic which finds usefulness in ordinary thermoplastic applications. For example, a 90 mg. sample of a 3.5:1 mixture of 1-cyanocyclobutene and 1-cyanobicyclobutane was heated with a trace of azobisisobutyronitrile. A chloroform-insoluble, high-softening thermoplastic, heat-stable solid copolymer was formed.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Process for preparing 1-cyanobicyclo[1.1.0]butane and 1-cyanocyclobutene which comprises subjecting β-cyanoprene to ultraviolet light in the presence of an inert solvent.

2. The process of claim 1 wherein the ultraviolet light has a wave length of between 150 and 4000 A. and the β-cyanoprene is present in a concentration of between 0.01 and 50.0 percent by weight.

3. The process of claim 1 wherein a catalytic amount of a cuprous salt is present.

4. The process of claim 2 wherein a catalytic amount of a cuprous salt is present.

5. The process of claim 1 wherein the inert solvent is selected from the class consisting of (1) aliphatic linear hydrocarbon ethers, (2) aliphatic cyclic hydrocarbon ethers, (3) aliphatic hydrocarbons and (4) halogenated aliphatic hydrocarbons.

6. The process of claim 1 wherein the β-cyanoprene is present in a concentration of between 0.1 and 5.0 percent by weight.

7. The process of claim 1 wherein the ultraviolet light has a wave length of between 2000 and 3500 A.

8. The process of claim 6 wherein the inert solvent is anhydrous hydrocarbon ether.

9. The process of claim 8 wherein a catalytic amount of cuprous chloride is present.

References Cited

Srinivasan: J.A.C.S., 85 (1963) 4045–6.
Crowley: Tetrahedron, 21 (1965) 1001–14.
Srinivasan: J.A.C.S., 84 (1962) 4141–43.

HOWARD S. WILLIAMS, Primary Examiner